(12) United States Patent
Jung

(10) Patent No.: US 6,644,803 B1
(45) Date of Patent: Nov. 11, 2003

(54) STRUCTURE FOR FIXING SIDE SHIELD FOR GLASSES

(75) Inventor: Sung Mo Jung, Daegu (KR)

(73) Assignee: Sam Chung Optical Co., Ltd., Daegu (KR)

( * ) Notice: Subject to any disclaimer, the term of this patent is extended or adjusted under 35 U.S.C. 154(b) by 0 days.

(21) Appl. No.: 10/310,035

(22) Filed: Dec. 5, 2002

(30) Foreign Application Priority Data

May 24, 2002 (KR) .................................. 20-2002-0015906

(51) Int. Cl.⁷ .................................................. G02C 7/44

(52) U.S. Cl. .................................. 351/44; 2/13; 351/121

(58) Field of Search ........................... 351/44, 121, 111, 351/41, 158, 153; 2/12, 13, 448, 449; 16/228

(56) References Cited

U.S. PATENT DOCUMENTS 5,798,815 A * 8/1998 Hirschman et al. ........... 351/44

* cited by examiner

Primary Examiner—Hung Xuan Dang
(74) Attorney, Agent, or Firm—Jacobson Holman PLLC

(57) ABSTRACT

The present invention relates to a structure for fixing a side shield for glasses. In the present invention, the structure for fixing a side shield for glasses according to the present invention is capable of easily installing a side shield based on a work that a bolt is engaged to a hinge portion of the connection member and the glasses leg, namely, a work that the glasses leg is rotatably engaged to the connection member, by improving a bolt which hinge-engages the glasses leg without using an additional element. Therefore, in the present invention, it is possible to easily enhance a productivity by simply assembling the side shield to the glasses.

2 Claims, 3 Drawing Sheets

STRUCTURE FOR FIXING SIDE SHIELD FOR GLASSES

BACKGROUND OF THE INVENTION

1. Field of the Invention

The present invention relates to a structure for fixing a side shield for glasses capable of protecting eyes from a foreign substance, and in particular to a structure for fixing a side shield for glasses by which it is possible to easily assemble a side shield by improving a bolt which hinges a glasses leg.

2. Description of the Background Art

When a person wears glasses, since a distance between left and right glasses legs and a glasses frame, a certain foreign substance may be inserted into a user's eyes for thereby causing a viewing problem. In particular, in an industry field, since there are much foreign substances in the air, a worker may have serious eye problems.

Therefore, a side shield is installed in a glasses leg using screws. In this case, namely, a side shield is fixed to a glasses leg using screws, an error ratio of product is decreased, and a workability is decreased.

Therefore, the applicant of the present invention filed a Korean utility model No. 2199 in 1999. In the above application, a fixing pin is used for fixing a side shield to a glasses leg, not using a screw. The above fixing pin has a body having a certain size same as a diameter of an installation hole formed in a side shield. A pin head is expanded in one end of the body. An elastic piece separated by a cutting portion is formed in another portion of the body. A curved portion formed in an outer end portion of the elastic piece together with an engaging shoulder portion is integrally formed.

In the above conventional art, when a fixing pin is inserted into an installation hole formed in a side shield, a side shield is fixed to a glasses leg by the fixing pin.

However, in the conventional art, since a certain element such as a screw or fixing pin is used for fixing a side shield to a glasses leg, a process for forming a hole in a glasses leg and a process for forming a hole in a side shield are additionally performed for thereby increasing the number of work processes. Therefore, a worker's workability is decreased.

SUMMARY OF THE INVENTION

Accordingly, it is an object of the present invention to provide a structure for fixing a side shield for glasses which overcomes the problems encountered in the conventional art.

It is another object of the present invention to provided a structure for fixing a side shield for glasses which is capable of enhancing a productivity by assembling a side shield by only installing a glass leg by improving a bolt which hinges a glasses leg without using an additional element.

To achieve the above objects, in a side shield for glasses in which a connection member is installed between a glasses frame and a glasses lens, and the glasses leg is rotatably installed to the connection member, so that it is possible to surround a part of the glasses leg and the connection member and prevent a foreign substance which is provided through the sides of the glasses, and a through port is formed in an upper side of the hinge portion between the glasses leg and the connection member, there is provided a structure for fixing a shield for glasses in which a bolt 11 capable of rotatably connecting the connection member 2 and the glasses leg 3 is installed through a through port 4a of the side shield 4 in such a manner that a surrounding surface of the head 11a of the bolt 11 is provided near an inner surrounding surface of the through port 4a *of the side shield 4*.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 1:
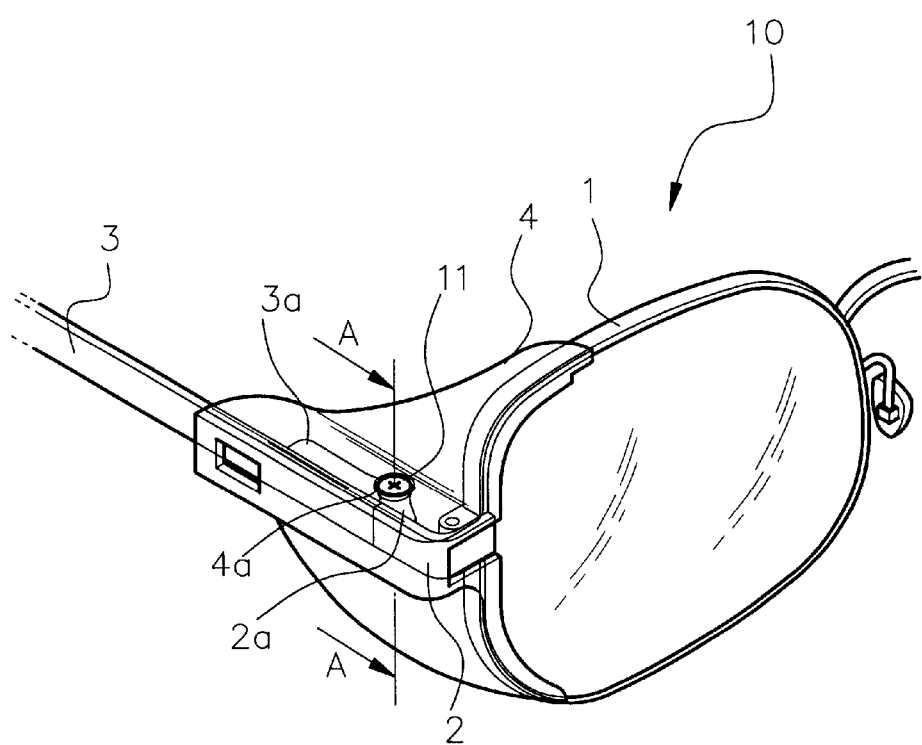
FIG. 1 is a partial perspective view illustrating glasses for describing a structure for fixing a side shield for glasses according to the present invention.

FIG. 1 is a view illustrating a part of glasses to which a fixing structure of a side shield according to the present invention is adapted. As shown therein, the present invention is adapted to a glasses 10 in which one side of a connection member 2 is fixed to a glasses flame 1, and the other side of the connection member 2 is rotatably installed to a glasses leg 3. In addition, the present invention is adapted to a frameless glasses in which a connection member is installed between a glasses lens and a glass leg.

Figure 2:
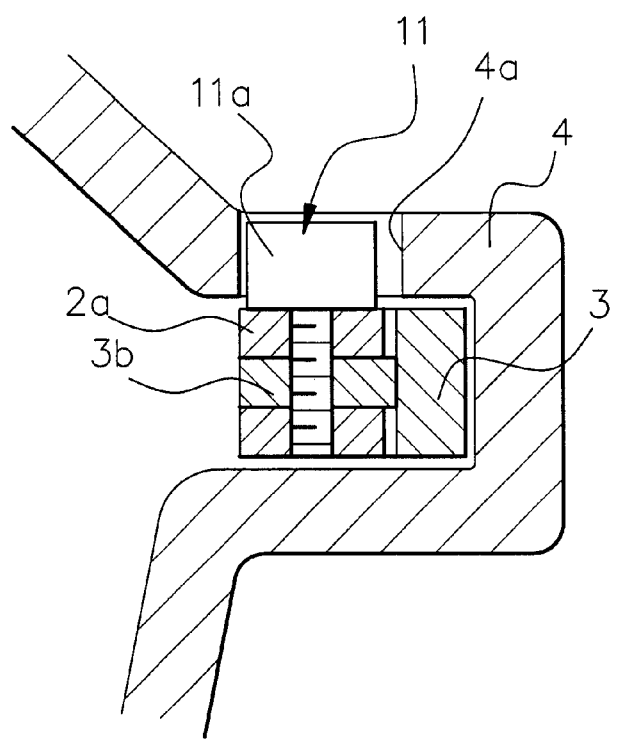
FIG. 2 is a cross-sectional view taken along line A—A of FIG. 1 for describing another example of a structure for fixing a side shield for glasses according to the present invention.
Figure 3:
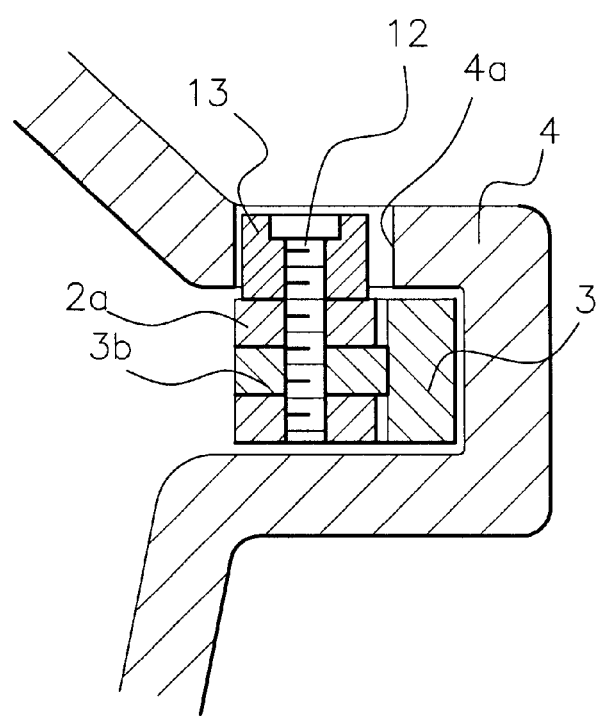
FIG. 3 is a cross-sectional view taken along line A—A of FIG. 1 for describing another example of a structure for fixing a side shield for glasses according to the present invention.

As shown in FIGS. 2 and 3, a portion between a hinge portion 3b protruded from a spring casing 3a installed in the glasses leg 3 and a hinge portion 2a of the connection member 2 is rotatably connected.

In addition, the side shield 4 is capable of surrounding a part of the glasses leg 3 and the connection member 2 and preventing a foreign substance which is inputted from the side portions of the glasses. A through port 4a is formed in an upright upper portion of the hinged portion between the glasses leg 3 and the connection member 2.

As shown in FIG. 2, in accordance with an example of a structure for fixing a side shield for glasses according to the present invention, a bolt 11 which is capable of rotatably connecting the glasses leg 3 and the connection member 2 is installed through the through port 4a of the side shield 4. In particular, a surrounding surface of a head 11a of the bolt 11 is formed near an inner surrounding surface of the through port 4a of the side shield 4.

Therefore, the head 11 of the bolt 11 is engaged to the through port 4a of the side shield 4 for thereby easily fixing the side shield 4.

As shown in FIG. 3, in accordance with another example of a structure for fixing a side shield for glasses according to the present invention, a spacer 13 is capable of surrounding a head of a bolt 12 having a small head size may be further included.

In the above example, a surrounding surface of the spacer 13 is formed near an inner surrounding surface of the through port 4a of the side shield 4.

The operation of the structure for fixing a side shield for glasses according to the present invention will be described.

In the case that the side shield 4 is installed, the glasses leg 3 and the connection member 2 are connected using the bolt 11, and the side shield 4 is installed together with the glasses leg 3.

Namely, the side shield 4 is installed at an end portion of the glasses leg 3. The bolt 11 is installed in the hinge portions 2a and 3b of the connection member 2 and the glasses leg 3 through the through port 4a formed in the side shield 4.

A surrounding surface of the head 11a of the bolt 11 is positioned in an inner surrounding surface of the through port 4a of the side shield 4, so that the side shield 4 is easily fixed by the head 11a of the bolt 11.

In the case that the spacer 13 is installed in the hinge portions 2a and 3b of the connection member 2 and the glasses leg 3 together with the bolt 12, a surrounding surface of the spacer 13 is positioned in an inner surrounding surface of the through port 4a of the side shield 4, so that the side shield 4 is easily fixed by the spacer 13.

Therefore, in the present invention, it is possible to install the side shield 4 is by only installing the bolts 11 and 12.

As described above, the structure for fixing a side shield for glasses according to the present invention is capable of easily installing a side shield based on a work that a bolt is engaged to a hinge portion of the connection member and the glasses leg, namely, a work that the glasses leg is rotatably engaged to the connection member, by improving a bolt which hinge-engages the glasses leg without using an additional element. Therefore, in the present invention, it is possible to easily enhance a productivity by simply assembling the side shield to the glasses.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a side shield for glasses in which a connection member is installed between a glasses frame and a glasses lens, and the glasses leg is rotatably installed to the connection member, so that it is possible to surround a part of the glasses leg and the connection member and prevent a foreign substance which is provided through the sides of the glasses, and a through port is formed in an upper side of the hinge portion between the glasses leg and the connection member, a structure for fixing a shield for glasses in which a bolt 11 capable of rotatably connecting the connection member 2 and the glasses leg 3 is installed through a through port 4a of the side shield 4 in such a manner that a surrounding surface of the head 11a of the bolt 11 is provided near an inner surrounding surface of the through port 4a of the side shield 4.

2. The structure of claim 1, further comprising:

a spacer 13 which surrounds a head of the bolt in such a manner that a surrounding surface of the spacer is provided near an inner surrounding surface of the through port of the side shield.

* * * * *